US008930747B2

(12) United States Patent
Levijarvi et al.

(10) Patent No.: US 8,930,747 B2
(45) Date of Patent: Jan. 6, 2015

(54) PRIVATE CLOUD REPLICATION AND RECOVERY

(75) Inventors: Emmanuel S. Levijarvi, San Rafael, CA (US); Ognian S. Mitzev, San Ramon, CA (US)

(73) Assignee: Sungard Availability Services, LP, Pittsburgh, PA (US)

( * ) Notice: Subject to any disclaimer, the term of this patent is extended or adjusted under 35 U.S.C. 154(b) by 370 days.

(21) Appl. No.: 13/436,111

(22) Filed: Mar. 30, 2012

(65) Prior Publication Data

US 2013/0263122 A1 Oct. 3, 2013

(51) Int. Cl.
G06F 11/07 (2006.01)
(52) U.S. Cl.
USPC .......................... 714/6.3; 714/4.11
(58) Field of Classification Search
CPC .............. G06F 11/203; G06F 11/2023; G06F 11/2033; G06F 11/2094; G06F 11/1484
USPC .................................. 714/4.11, 6.3
See application file for complete search history.

(56) References Cited

U.S. PATENT DOCUMENTS

| 7,861,111 | B2 | 12/2010 | Doerr |
| 7,987,158 | B2 | 7/2011 | Boyd et al. |
| 8,121,966 | B2 | 2/2012 | Routray et al. |
| 8,135,838 | B2 | 3/2012 | Geist |
| 2007/0174691 | A1 | 7/2007 | D'Souza et al. |
| 2008/0250222 | A1* | 10/2008 | Gokhale et al. ............... 711/203 |
| 2009/0210427 | A1 | 8/2009 | Eidler et al. |
| 2009/0222690 | A1 | 9/2009 | Seelig et al. |
| 2009/0300609 | A1 | 12/2009 | Hicks et al. |
| 2009/0313447 | A1 | 12/2009 | Nguyen et al. |
| 2010/0070725 | A1* | 3/2010 | Prahlad et al. ............... 711/162 |
| 2010/0115332 | A1 | 5/2010 | Zheng et al. |
| 2010/0228819 | A1 | 9/2010 | Wei |
| 2010/0262586 | A1 | 10/2010 | Rosikiewicz et al. |
| 2011/0087899 | A1* | 4/2011 | Fetik ............................. 713/193 |
| 2011/0119427 | A1 | 5/2011 | Dow et al. |
| 2011/0173405 | A1 | 7/2011 | Grabarnik et al. |
| 2011/0196842 | A1* | 8/2011 | Timashev et al. ............. 707/679 |
| 2011/0251992 | A1* | 10/2011 | Bethlehem et al. ........... 707/610 |
| 2012/0016840 | A1 | 1/2012 | Lin et al. |
| 2012/0054396 | A1 | 3/2012 | Bhattacharya et al. |
| 2012/0144391 | A1* | 6/2012 | Ueda ............................ 718/1 |
| 2013/0014102 | A1* | 1/2013 | Shah ............................ 718/1 |
| 2013/0061014 | A1* | 3/2013 | Prahlad et al. ............... 711/162 |
| 2013/0132956 | A1* | 5/2013 | Ashok et al. ................. 718/1 |
| 2013/0151685 | A1* | 6/2013 | Bursell ........................ 709/223 |

OTHER PUBLICATIONS

European Search Report mail date Jul. 3, 2013 for European Patent Application No. 13 16 0943, filed on Mar. 25, 2013 for Private Cloud Replication and Recovery by SunGard Availability Services, LP, 5 pages.

(Continued)

Primary Examiner — Chae Ko
(74) Attorney, Agent, or Firm — Cesari and McKenna, LLP

(57) ABSTRACT

Replication and recovery for a protected private cloud infrastructure that may include hosts, virtual machines (VMs) provisioned on the hosts, storage arrays and a management server. Metadata is periodically captured and made accessible to a recovery site. Upon a recovery event, replication of storage arrays is halted, and a number of target machines corresponding to the management server and the hosts to be recovered are assigned. The assigned management server and hosts are then bare provisioned by installing operating systems or hypervisors as specified by the metadata. Only then are recovery target machines connected to the replicated storage arrays so that virtual machines can be activated.

21 Claims, 9 Drawing Sheets

(56) References Cited

OTHER PUBLICATIONS www.vmware.com/.../VMware-vCenter-Site-Recovery-Manager-with . . . "VMware vCenter Site Recovery Manager 5 with vSphere Replication" Product Datasheet, downloaded from Internet Apr. 12, 2012, 2011.

www.vmware.com/pdf/vmware_doubletake.pdf ; "Double-Take Replicaiton in the VMware Environment" downloaded from Internet Apr. 12, 2012, 2006.

Wendt, J. et al., "Affordable Replication for both File and Block Storage is Attainable for Midsize Organizations", DCIG LLC, Dec. 15, 2009, downloaded from http://www.dcig.com/2009/12/affordable-replication-file-block.html, 12 pages.

Notice of Intention to Grant mail date Aug. 11, 2014 for European Application No. 13 160 943.0 filed on Mar. 25, 2013 by Sungard Availability Services, LP, 7 pages.

* cited by examiner

PRIVATE CLOUD REPLICATION AND RECOVERY

BACKGROUND

Replication of data processing systems to maintain operational continuity is now required almost everywhere. The costs incurred during downtime when information technology equipment and services are not available can be significant, and sometimes even cause an enterprise to halt operations completely. With replication, aspects of data processing machines that may change rapidly over time, such as their program and data files, physical volumes, file systems, etc. can be duplicated on a scheduled or continuous basis. Replication may be used for many purposes such as assuring data availability upon equipment failure, site disaster recovery or planned maintenance operations.

Replication may be directed to either the physical or virtual processing environment and/or different abstraction levels. For example, one may undertake to is replicate each physical machine exactly as it exists at a given time. However, replication processes may also be architected along virtual data processing lines, with corresponding virtual replication processes, with the end result being to remove the physical boundaries and limitations associated with particular physical machines.

Use of a replication service as provided by a remote or hosted external service provider can have numerous advantages. Replication services can provide continuous availability and failover capabilities that are more cost effective than an approach which has the data center operator owning, operating and maintaining a complete suite of duplicate machines at its own data center. With such replication services, physical or virtual machine infrastructure is replicated at a remote and secure data center.

In the case of replication services to virtual target, a virtual disk file containing the processor type and configuration, operating system, data, and applications for each data processor in the production environment is created and retained in a dormant state. In the event of a disaster, the virtual disk file is moved to a production mode within a remote and secure data center. Applications and data can then be accessed on the remote data center, enabling the service customer to continue operating from the cloud while recovering from a disaster.

From the perspective of the service customer, the replication service provider thus offers a Recover to Cloud (R2C) service that is provided much like an on-demand utility (similar to the electricity grid) over a network (typically the Internet). This is enables a data center operator to replicate critical servers and applications in his production environment to the cloud.

Therefore, existing disaster recovery products do accommodate virtualized environments. They can also provide centralized management of recovery plans enabling non-destructive testing and automated site recovery and migration processes. These products can also be used to specify which data process resources are to be recovered. However, such products most often require provisioning of resources at the recovery site in advance of a recovery event and do not offer optimum flexibility.

SUMMARY OF PREFERRED EMBODIMENTS

In a preferred configuration, a protected private cloud infrastructure may include hosts, and virtual machines provisioned on the hosts. This environment may also include storage arrays and a management server. The host machines provide processing resources and memory to the virtual machines. The storage, typically provided by separate hardware, contains an array of disks that may preferably be formed as a storage array network that connects the host machines to the storage arrays. A management server is also responsible for orchestration of the environment as well as maintaining metadata about the components that make up the private cloud virtual infrastructure.

A preferred process operates the management server to permit a user to configure the hosts and storage arrays and to provision virtual machines on the hosts. A separate process continuously replicates the storage arrays to a recovery site. This process may be carried out as part of a continuous storage replication scheme that is operates entirely within the context of the storage array network and separate from the disaster recovery functions.

Metadata is periodically obtained from the management server. The collected metadata configuration of the hosts and virtual machines is replicated at a metadata repository accessible at or located on the recovery site. Thus, it is understood that in a preferred arrangement replicating this metadata occurs independently of replicating the storage arrays.

Upon a recovery event, such as may occur upon disaster or disaster test, replication of the storage arrays is halted. At this point, a number of target machines corresponding to the management server and the hosts are assigned. It should be noted that these hosts are not previously assigned to this task prior to the disaster event.

The assigned management server and hosts are then bare metal provisioned for example, by installing operating systems or hypervisors as specified by the metadata. The management server is then recovered from the metadata to one of the recovery target machines and the hosts are also recovered from the metadata.

It is only after the management server and all such hosts are bare metal provisioned is the next step taken of connecting the recovery target machines to the replicated storage arrays. This causes virtual machine's metadata to also be retrieved for the recovery target machines.

However, prior to accessing the metadata to determine recovery of the virtual machines, the user may access the management server to specify which virtual machines are to actually be recovered. Specification of which virtual machines are to be recovered can therefore be delayed until such time as disaster occurs and the user need not specify which virtual machines are to be recovered in advance of such an event.

This approach to private cloud replication provides distinct advantages from the perspective of a service provider. The physical machines necessary for providing the recovery service need not be specifically tied to any particular protected environment prior to a disaster event. It is only when a customer acquires a need for them, are such is recovery machines tied down to a given role. All that is needed to be persisted by the recovery service is the host and management server metadata. This can be metadata can be stored in a repository, such as a shared database, that provides secure access to different customers.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF EXAMPLE EMBODIMENTS

Introduction

The present disclosure describes a private cloud replication service designed to provide continuous protection for a virtual machine infrastructure. There are two parts to the replication, virtual machine storage and metadata, each describing different aspects of the infrastructure. Though it is not a requirement, storage replication is continuous—data is replicated as it is created. Metadata is replicated periodically and separate from storage replication. At time of recovery automated processes use replicated virtual machine storage and virtual infrastructure metadata to recreate a private cloud in a recovery site.

Typical Private Cloud

Figure 1:
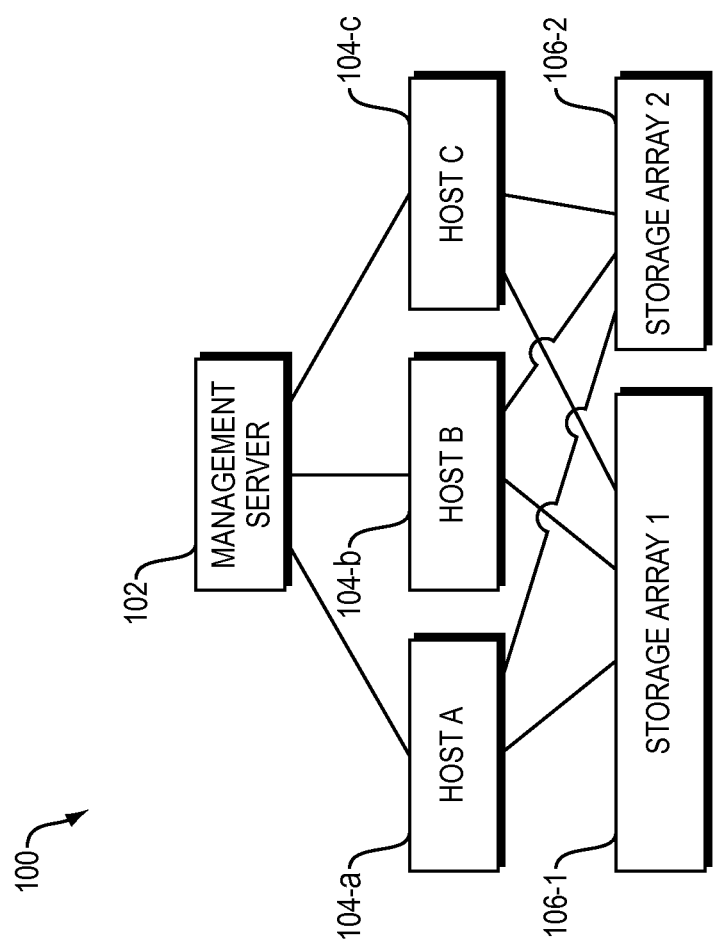
FIG. 1 is a typical private cloud virtual infrastructure supported by the replication service.

FIG. 1 illustrates a typical private cloud infrastructure 100 supported by this service consists of virtual machine hosts 104-A, 104-B, 104-C, storage arrays 106-1, is 106-2, and a management server 102. Hosts (physical machines) 104 run hypervisor software, which enables multiple virtual machines to run on the same physical hardware. The host machines 104 provide CPU and memory resources to the (guest) virtual machines. Storage is usually provided by separate hardware, containing an array 106 of disks. The arrays 106 can be arranged as a storage area network, or SAN, which is responsible for connecting the host machines to the storage arrays 106.

The Management Server 102 is primarily responsible for orchestration of the private cloud 100. It also maintains metadata about the components that make up the private cloud virtual infrastructure 100 in a manner to be described in more detail below.

The private cloud virtualized environment may be provided using platform such as VMWare. In such an environment, the management server may be based on a VCenter. However, other virtualization solutions may be used.

Figure 2:
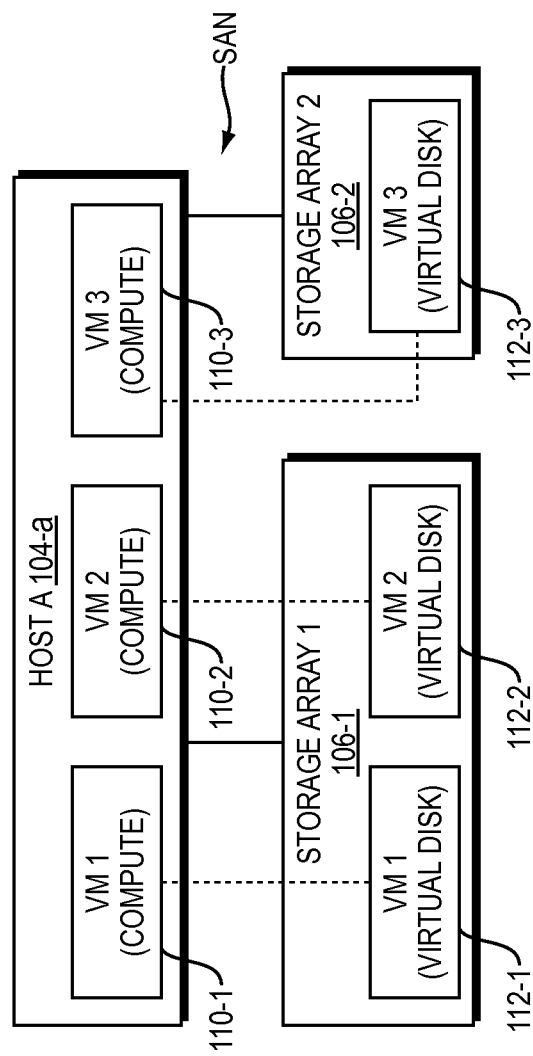
FIG. 2 shows more detail of the private cloud virtual infrastructure.

The more detailed partial view of FIG. 2 shows a representative host, Host A 104-A, and the two storage arrays 106-1, 106-2. Host A is physically connected to both Storage Arrays, represented by solid lines. In this example, Host A is providing CPU and memory to three virtual machines, VM 1 110-1, VM 2 110-2, and VM 3 110-3. Storage Array 1 160-1 is providing storage to VM 1 110-1 and VM 2 110-2, while Storage Array 2 160-2 is providing storage to VM 3 110-3. The virtual machines 110 are also logically connected to their associated virtual disks 112-1, 112-2, 112-3 residing on the storage arrays, represented by the dashed lines.

Private Cloud Replication

Figure 3:
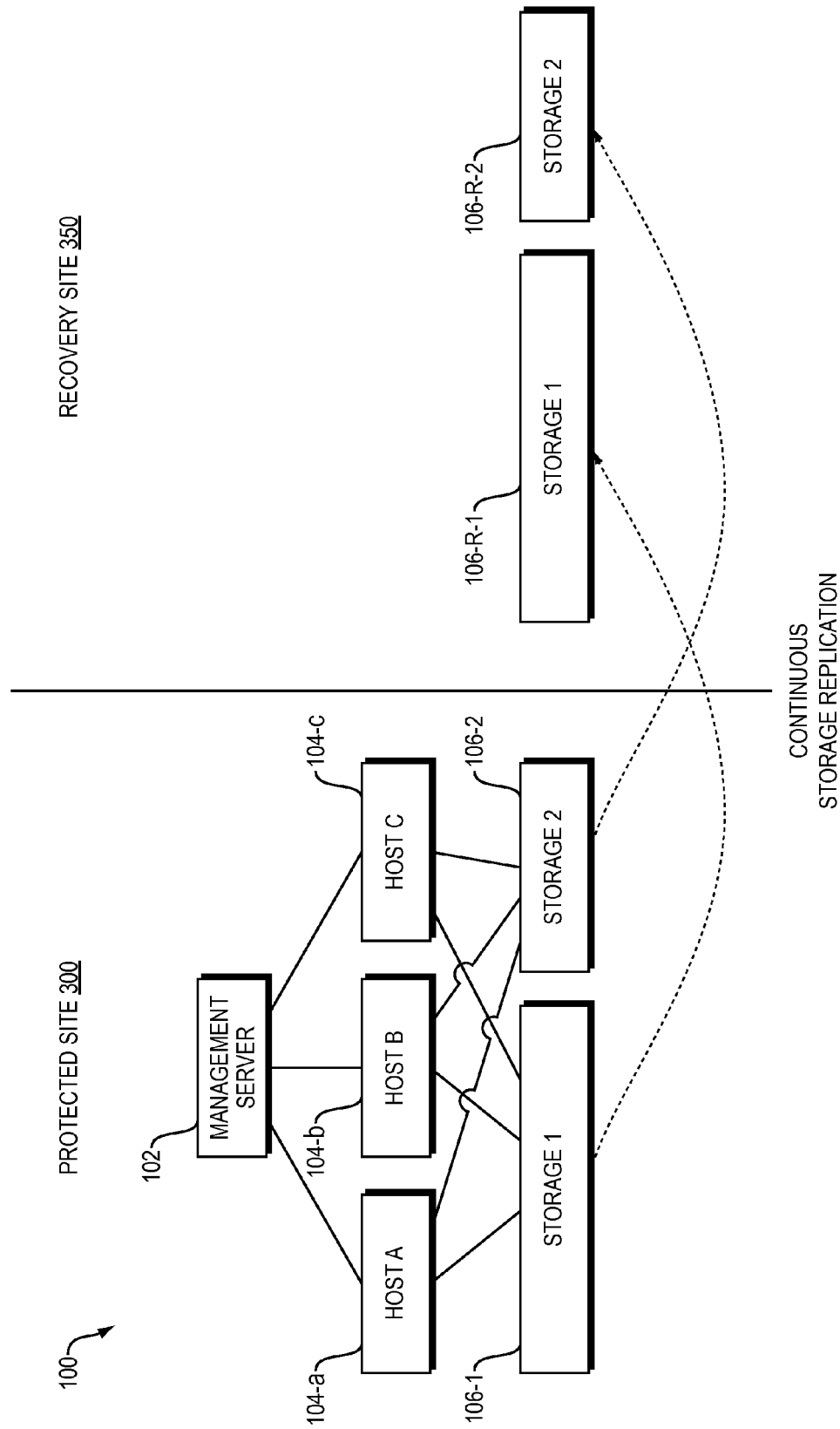
FIG. 3 illustrates continuous replication of the storage arrays.

FIG. 3 illustrates the private cloud 100 as installed at a protected site 300. A recovery site 350 is also shown. Recovery site may typically be operated as a service to the owner/operator of the protected site 300. As such, the recovery site 350 may service many protected site 300, although only one protected site 300 is shown. Under normal operation, the storage arrays 106 are continuously replicated from the protected site 300 to the recovery site 350. This replication may occur within the content of the is SAN and separately from any recovery process described here.

Because the virtual machines 110 store their data on the storage arrays 106-1, 106-2, by way of their virtual disks 112, this continuous replication process also automatically and without further intervention by management server 102 replicates the virtual machine data. As shown in FIG. 3, the recovery site 350 would be equipped with permanent recovery storage arrays 106-R-1, 106-R-2 to accept the replicated data. An alternative configuration could have no permanently installed storage on the recovery side. Instead, the replication storage 106-R arrays could be populated at the time of need by physically bringing data to the recovery site 350. Tape based backups would be one such example of a medium for transferring data to the recovery site in a non-continuous fashion.

Metadata Capture

Figure 4:
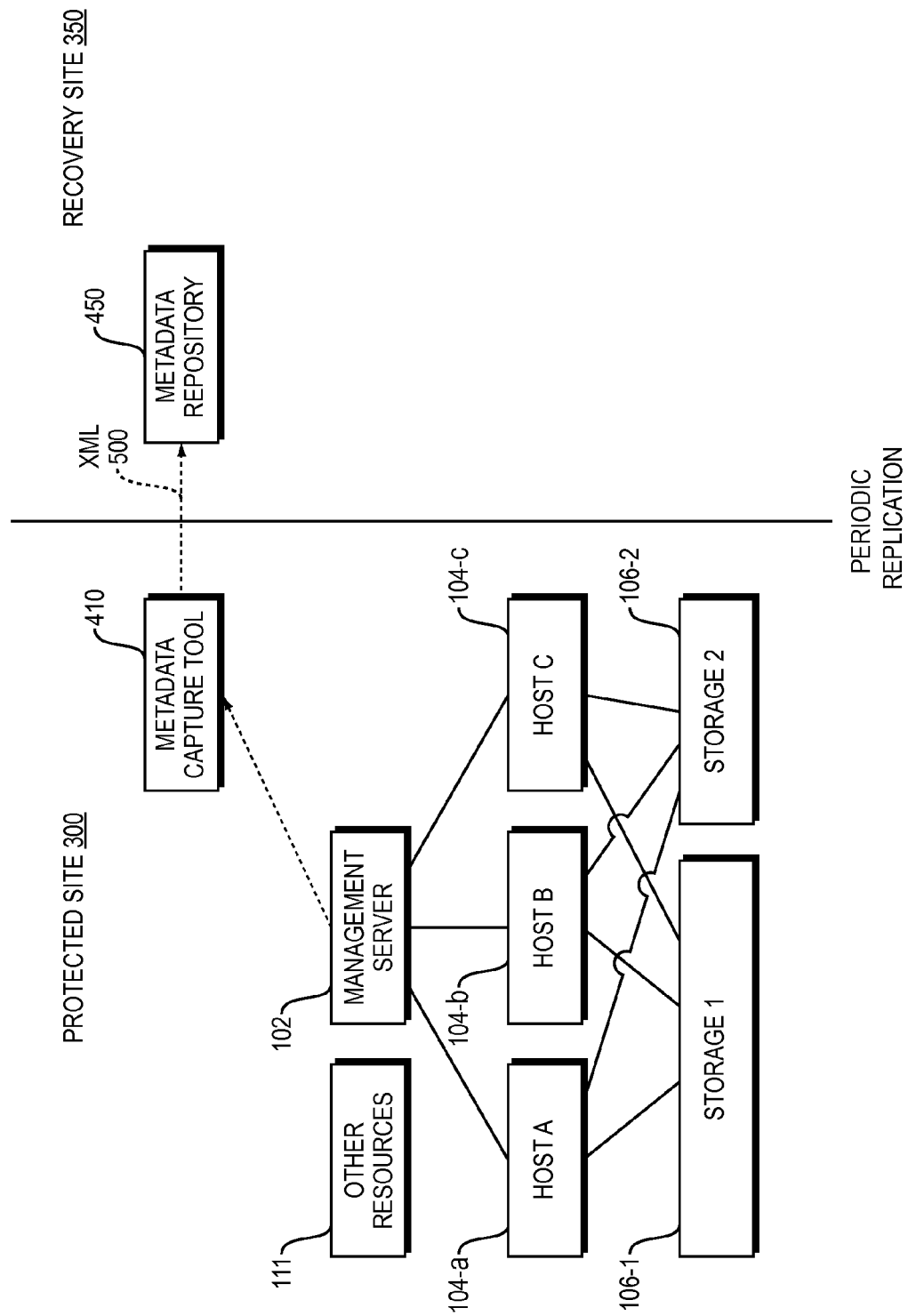
FIG. 4 illustrates a separate but simultaneous process that handles metadata replication.

FIG. 4 shows how a separate, but simultaneous process handles metadata replication. The storage by itself only contains virtual disks 112, or storage for the virtual machines 110. Metadata is required to reconstruct the hosts 104 and to specify the virtual machines 110 that run inside them. Metadata replication is handled by a capture tool 410, which exports data from the management server 102 and serializes it to an metadata XML document, which can be read at a later time. This metadata replication process is periodic; it typically occurs on a similar schedule as a backup process for example, once per day, late at night. It therefore occurs preferably asynchronous to, and separate from, any changes the user might make to the VM configuration during the day. The XML document containing the metadata would then be transferred to, and persisted by, a metadata repository 450 located at or at least separately accessible by the recovery site 350.

Metadata replication is first handled by a capture tool 410, which exports data from the management server 102 and serializes it to stored form (such as an XML document) which can be read at a later time.

The capture tool 410 is pre-configured with a list of data elements (metadata), is which describe the private cloud infrastructure. This list is a subset of, but not all of, the available data concerning the private cloud infrastructure. The subset is limited to that data which must be retrieved in order to successfully reconstitute a functional copy of the original private cloud infrastructure at time of test or recovery. The capture tool 410 makes use of application programming interfaces (APIs) provided by the management server 102 to create this a subset profile of the private cloud infrastructure. For example, the capture tool can query the management server 102 for all of the host machines 104 under its control, and then present that list via the API for generating the subset. It will also look for arrangements of hosts 104, such as in clusters or hierarchical folder structures—it may be necessary to make several follow-up queries to get a complete listing of hosts 104 under the management server's 102 control.

Once a comprehensive list of hosts and host arrangements are generated, the capture tool 410 then inspects each of the hosts 104 for further data. For example, hosts 104 may contain a number of guest machines and may also contain virtual network devices, storage, or other data center resources 111 (as described in FIG. 2 and shown in FIG. 4, for example). The capture tool 410 will thus make further inquiries based on what it finds within each host 104. Each such guest and/or virtual network device will contain further relevant data, which will be captured during these later requests to the management server API. The metadata is therefore possibly further processed by metadata capture tool 410.

At the conclusion of the capture process, the capture tool 410 operates to construct a document (XML), which is used to transfer the metadata to the recovery site 350.

XML File with Virtual Infrastructure Metadata

Figure 5:
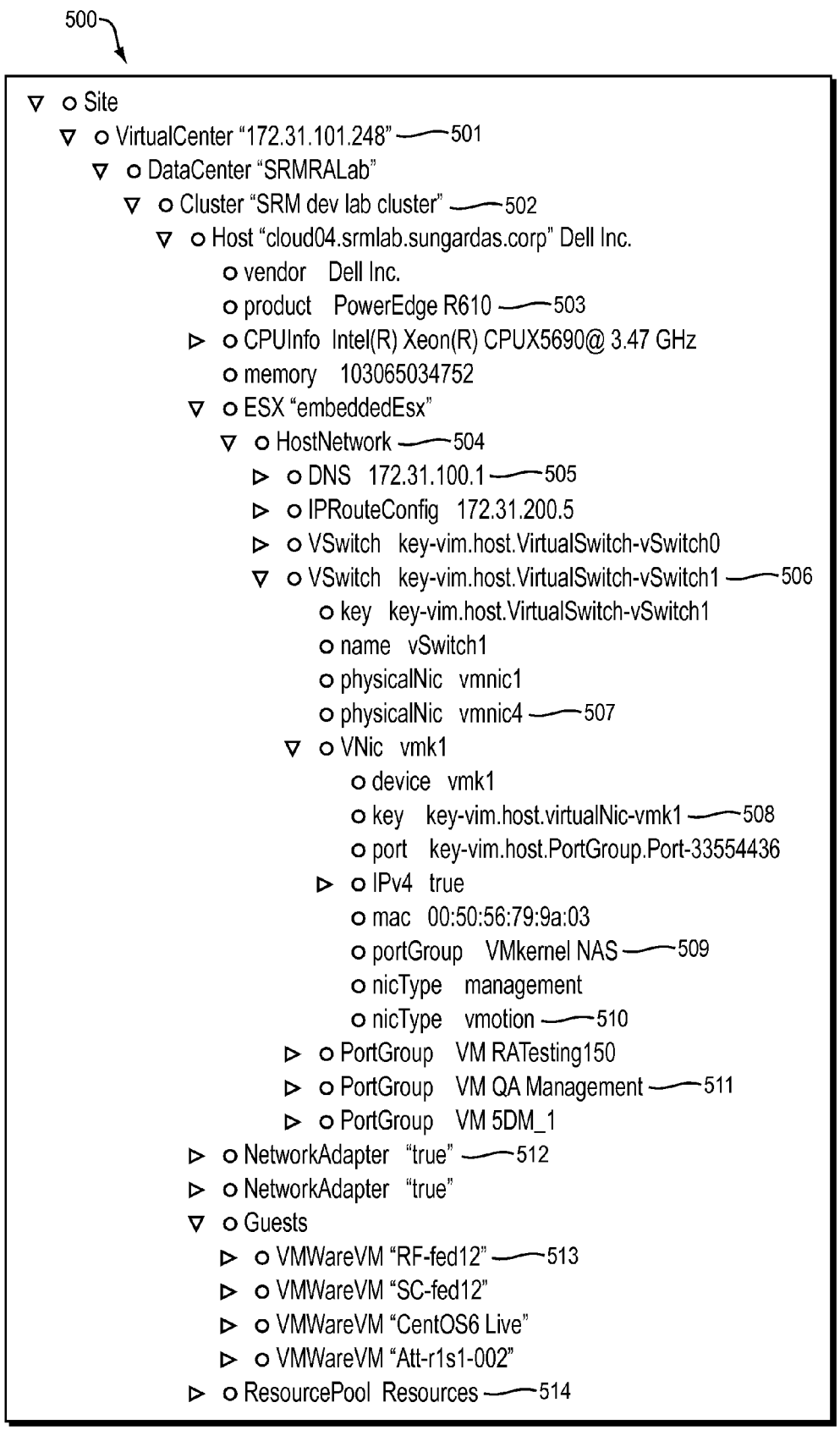
FIG. 5 is an example entry in the metadata repository.

FIG. 5 illustrates a sample of captured virtual infrastructure metadata XML file 500 contain the information about all of the virtual machines 110 and virtual machine hosts 104 and they way they are interconnected at the protected site 300. The is sample illustrates the collected metadata.

501 Information about the management server 102: address, datacenter name

502 Clusters are groupings of hosts 104 and virtual machines 110, used for fault tolerance and virtual machine movement.

503 Hardware information about a host machine 104.

504 The type of host 104. In this example, the host is VMware ESXi.

505 Network configuration for the host 104.

506 Virtual Switch (running within the host) configuration

507 Physical network interfaces, used by the virtual switch to route network traffic outside of the host 104.

508 Virtual network interface configuration—used by management network traffic.

509 Network configuration for the virtual network interface.

510 Types of traffic, which can flow over the virtual network interface.

511 Port Groups are groupings of virtual ports on a virtual switch.

512 Physical network interface configuration; referenced earlier in line 7.

513 Virtual Machine (or guest) definitions.

514 Resource Pool definitions. Resource pools are used to distribute CPU and Memory resources.

It should be understood this is a simplified example and an actual metadata file would typically include more information that is not initial to recovery.

Private Cloud Recovery

Figure 6:
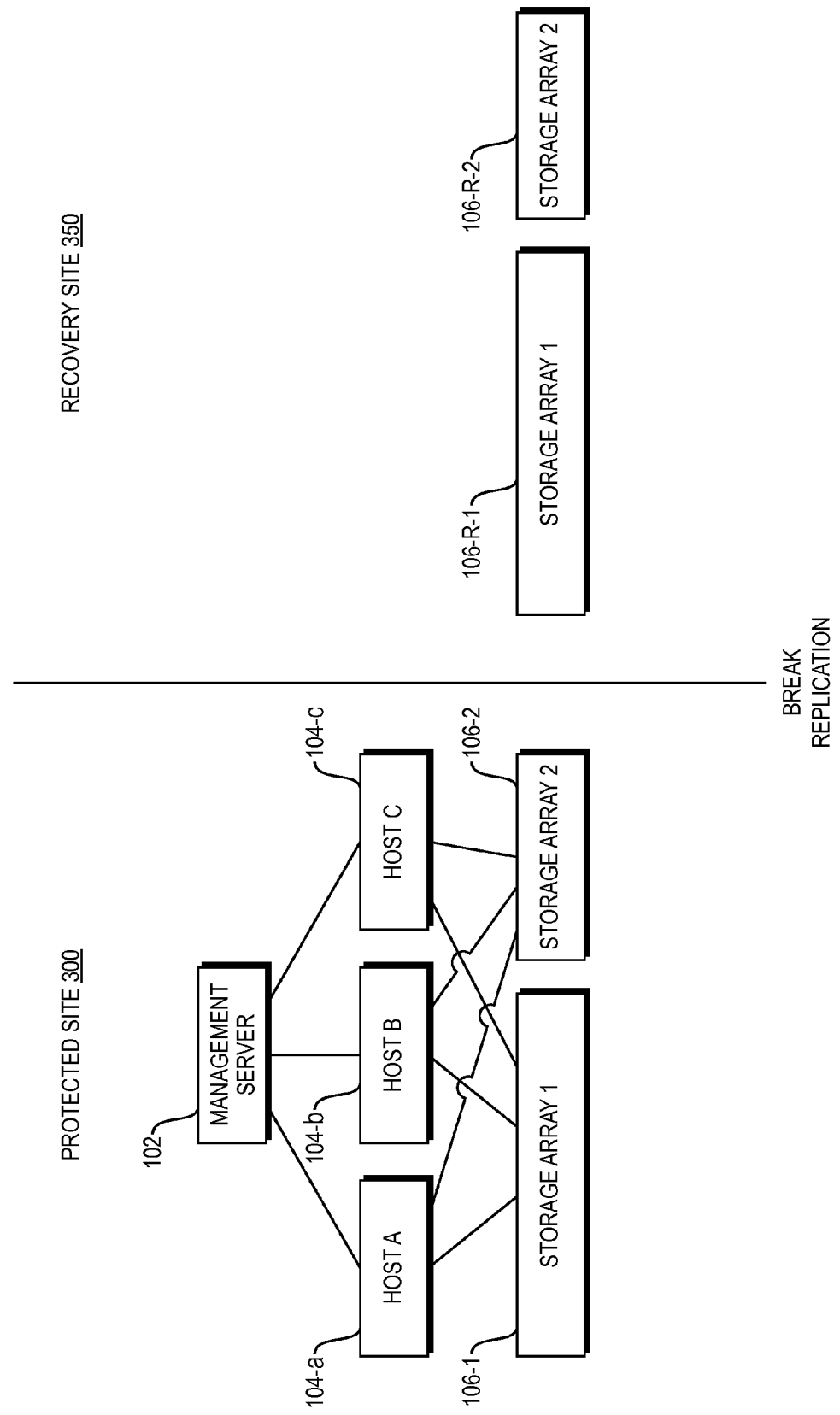
FIG. 6 illustrates how at time of recovery replication between the storage device is broken.

As shown in FIG. 6, time of recovery, the replication between storage devices is broken. This can be planned, in the case if a test, or can be unplanned as a result of a failure at the protected site (e.g., one or more connections in the SAN are broken).

Figure 7:
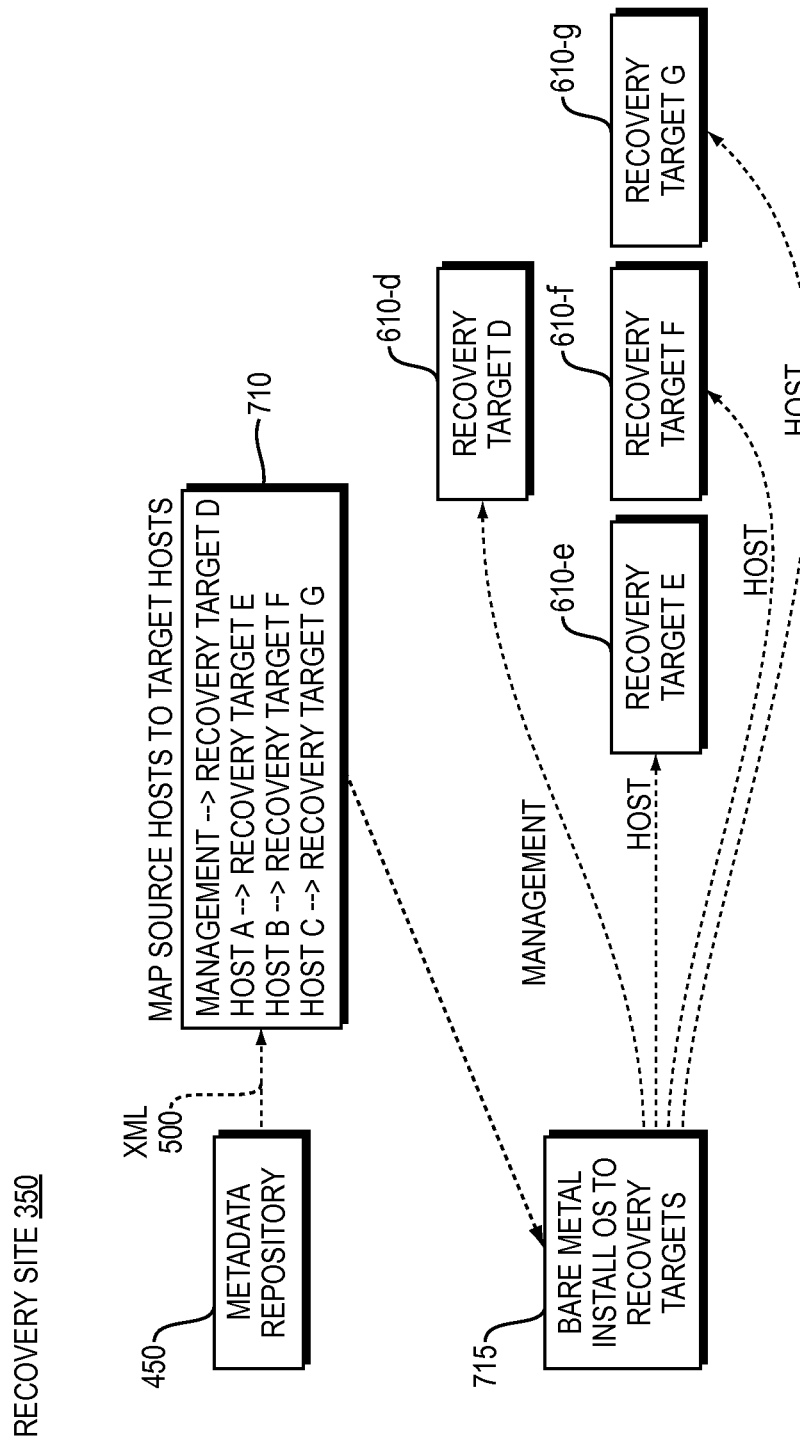
FIG. 7 shows a mapping process that is used to automatically install software and configure target hardware as needed at the time of recovery.

Turning attention to FIG. 7, a preferred recovery process begins by pulling metadata from the repository 450 and matching available physical machines in the recovery site 350 to physical machines that existed on the protected site. Sample is mapping:

| Management Server | 102 | Recovery Target D | 610-D |
| Host A | 104-A | Recovery Target E | 610-E |
| Host B | 104-B | Recovery Target F | 610-F |
| Host C | 104-C | Recovery Target G | 610-G |

This mapping can be represented by another file. One example for such file 710 XML mapping the management server 102 and Host A 104-A, is shown below. It shows that role of management server 102 will be given to recovery_D 610-S and the recovery_E 610-E will take the role of Host A 104-A. This also shows the deploy flag, which is set to true by default, meaning that Host A will be recovered.

```
<Site>
    <VirtualCenter name="management_01" targetid="recovery_D" >
    <DataCenter name="Corporate_IT">
    <Folder name="Linux Servers" type="host">
    <Host deploy="true" name="host_A.example.com
targetid="recovery_E">
```

This mapping is then used by automated processes to install software and configure the target hardware 610, as needed. Recovery target servers 610 can be managed as a pool of general resources, and allocated to recovery of a specific recovery site 350 entry upon an actual disaster or disaster test.

The XML document containing the private cloud metadata may also contain information concerning physical machines which are not directly part of the virtual is infrastructure. For example, a database application may run on a non-virtualized server. This non-virtualized machine may be necessary for the proper operation of applications running within virtual machines but it is not necessary for the operation of the virtual machines themselves more generally. As such, the Host to Recovery target mapping process shown in FIG. 7 may also accommodate physical-machine to physical-machine mapping. Continuing the example, the OS for the physical database server is thus installed via the same automated process that handles the management server and the host machines, but that process is instead carried out on a recovery target 610 that is a dedicated physical machine.

Automated systems for bare-metal operating system installation 715 often make use of a technique by which the target machine boots from the network, rather than internal storage. The technique used by this system is no different. This presents a challenge when recreating a network which existed in the protected site. In most cases, the network used for deployment on the recovery site 350 will not be compatible with the network to be recreated. If this is not addressed, the import tool 600 that recovers the hosts 610-E, 610-F, 610-G (which is run following bare metal OS installation 715), would be unable to contact the recovered management server 610-D. This problem can be solved by configuring an additional network interface on the recovered management server 610-D, which was not configure on the original management server 102 running in the protected site 300. The result is that recovered management server 610-D has one network interface on the network used for automation and OS installation, and one or more other network interfaces on the network, as specified in the metadata. The recovered management server 610-D is therefore connected to two networks simultaneously, using different network interfaces.

Figure 8:
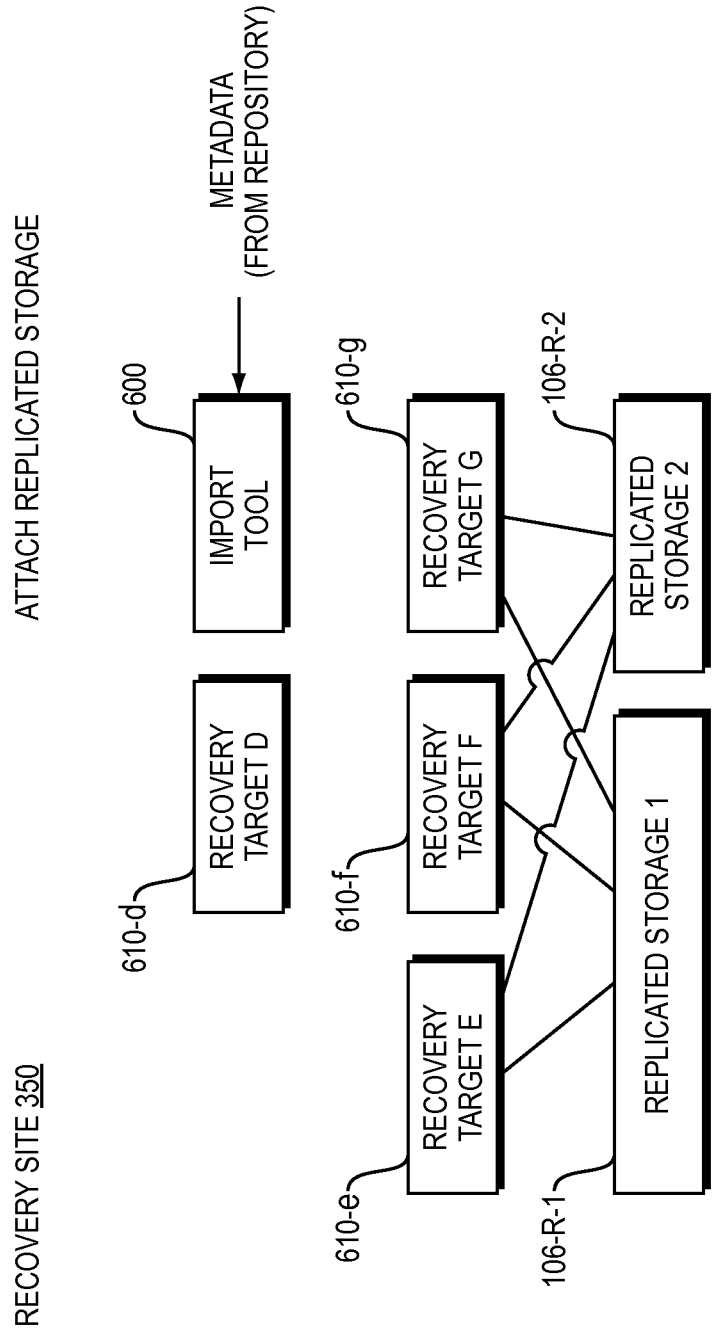
FIG. 8 illustrates how only as the subsequent step connections are made to the replicated storage arrays.

At this point, the recovery target machines 610 have the required OS or hypervisor software installed, but no storage is connected and the machines are not aware of each other. Further the management recovery machine 610-D has no information about virtual machines or virtual network configuration. The diagram of FIG. 8 shows the next step: connecting storage. There are no lines connecting the management server 610-D to the hosts 610-E, 610-F, 610-G, because this logical is connection has not yet been made.

During the protected host to recovery host mapping process, it is also possible for an administrative user to choose which virtual machines 110 will be recovered. This is similar, but simpler, to mapping hosts. It only requires a deploy flag to be set to true or false depending upon if the host is to be recovered, no mapping is required. An example representation:

```
<Guests>
    <VMWareVM deploy="true" memory="2048"
name="USALPALTP01" vcpus="1">
        <description>Prod. Mail Server</description>
        <datastorepath>[us_alp_lcl_esxp01]
USALPALTP01/USALPALTP01.vmx</datastorepath>
```

Finally, a metadata import tool 600 imports metadata 710 from the repository into the management server 610-D. The import tool 600 links the hosts 610-E, 610-F, 610-G with the management server 610-D, makes the management server 610-D aware of the storage, creates any required virtual networks within the hosts and registers virtual machines 110.

Metadata import 600 is a complement to the metadata capture 410 process. Data must be imported in the correct order or the import 600 will fail. For example, the protected site 300 includes other data processing resources 111 typically needed to implement a functioning Data Center, host clusters, and the like (see FIG. 4). Those other data processing resources 111, when instantiated as recovered resources 611 may need to be imported and brought on line prior to the hosts 104 being recovered. Recovered hosts 610 must also typically be imported prior to certain other resources 611 such as guests, virtual switches, and resource pools. Other storage resources 611 must also typically be configured after hosts but prior to guests. It is also important to avoid attempting to add resources which have already been imported. Virtual switch resources 611, for example, may not be imported twice.

The metadata import tool 600 thus contains and/or determines the necessary import order taking these considerations into account. For example, if the metadata import tool 600 encounters a pre-existing network item, such as a switch which exists in a default configuration, the metadata import tool 600 switches to a mode where it augments the recovery of that switch rather than attempting to add a duplicate.

Machines used as hosts 104 in the protected site 300 often contain many network interfaces. But during the early phases of the recovery process, there may be only a single network interface connected on the recovery site 350. More typically a recovered host 610-E will have one or more network interfaces configured to allow remote management of that host 610-E. If the network interface to the recovered management server 610-D, as specified in the metadata, is not physically connected at the time of metadata capture 410 the recovered management server 610-D will have lost a required management connection to that recovered host 610-E. The import tool 600 can detect this situation, prior to attempting the metadata import, and re-arrange the recovered network interfaces in a manner compatible with the original configuration, but ensuring that the recovered management interface is matched to a physically connected port on the recovered host 610-E.

Figure 9:
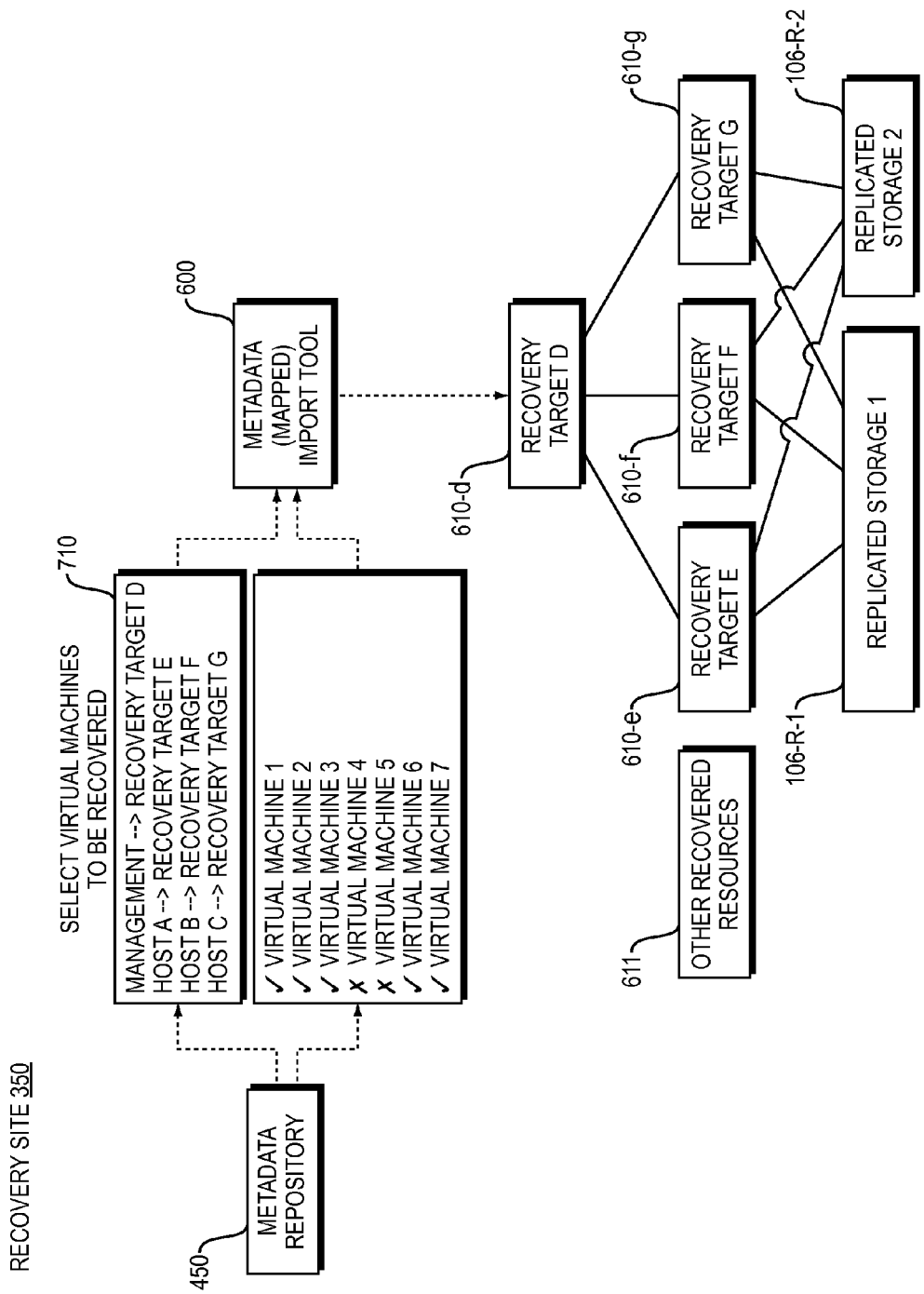
FIG. 9 illustrates how a user information import tool imports additional metadata from the repository to provision virtual machines with additional input from the user at the time of recovery to indicate which virtual machines are to actually be provisioned on the recovery hosts.

Referring now to FIGS. 8 and 9, a process for recovering a private cloud virtual infrastructure can therefore proceed as follows.

At an initial time of recovery there are not yet any target machines assigned to replace the hosts or the management server. Thus the recovery process much first go through a mapping where the metadata is used to map the hosts (as specified by the metadata) to replacement machines available on the recovery site. The replacement machines may be maintained as a resource pool, and only allocated to recovery of a particular site on demand.

Once this physical machine mapping finishes, the recovery process can then perform an initial bare metal provisioning of each such recovery target. This bare metal provisioning can install software necessary for the recovery target hardware to become virtual machine hosts and/or the management server. The storage arrays at this point are not yet connected and all we have done is to prepare an environment in which to recover the virtual machines.

Once the bare metal provisioning is complete, storage for the virtual machines as available via the replicated storage portions (provided for example via replication services inherent in the storage area network (SAN) itself) are connections are connected to the respective recovery target machines. At this point the respective recovery target machines still do not have information about the virtual machines in which they are expected to host and/or any connection to the management server.

Only at this point does the process consider the metadata further via a metadata import process, and first inform the management server about the hosts that are part of its cluster. The management server can then connect to the hosts, and thus allow for recovery of the virtual machines.

Partial recovery is possible as part of this process. In particular, it may not be desirable or necessary to recovery the entire virtual infrastructure, and the user can specify at the time of recovery, which particular virtual machines to be recovered.

The teachings of all patents, published applications and references cited herein are incorporated by reference in their entirety.

It should be understood that the example embodiments described above may be implemented in many different ways. In some instances, the various "data processors" described herein may each be implemented by a physical or virtual general purpose computer having a central processor, memory, disk or other mass storage, communication interface(s), input/output (I/O) device(s), and other peripherals. The general purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, is input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

The computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing resources as part of a shared marketplace. By aggregating demand from multiple users in central locations, cloud computing environments can be built in data centers that use the best and newest technology, located in the sustainable and/or centralized locations and designed to achieve the greatest per-unit efficiency possible.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the is software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method for recovery of a protected site, the protected site including hosts, virtual machines (VMs) provisioned on the hosts, storage arrays, and a management server, the method comprising:

prior to a recovery event,
    operating the management server to permit a user to configure the hosts and storage arrays, and to provision the VMs on the hosts;
    replicating the storage arrays to replicated storage arrays at a recovery site;
    capturing metadata from the management server concerning configuration of the hosts and VMs associated with each host to a metadata repository accessible to the recovery site;

upon a recovery event,
    stopping replication of the storage arrays to the replicated storage arrays;
    accessing the metadata repository for importing a metadata subset that represents configuration for recovery target machines, the metadata subset representing only a portion of the metadata replicated from the management server;
    assigning a number of target machines corresponding to the management server and hosts indicated by the metadata subset;
    installing operating systems on the recovery target machines;
    recovering the management server from the metadata subset to one of the recovery target machines;
    recovering the hosts from the metadata subset to recovery target machines;
    attaching recovery target machines to the replicated storage arrays; and
    provisioning VMs from the metadata subset on the recovery target machines.

2. The method of claim 1 wherein the metadata further includes at least one of a vertical switch configuration or resource pool definition.

3. The method of claim 1 wherein the steps of
    assigning a number of target machines corresponding to the management server and hosts,
    installing operating systems on the recovery target machines,
    recovering the management server,
    recovering the hosts from the metadata subset to recovery target machines,
    attaching recovery target machines to the replicated storage arrays, and
    provisioning VMs from the metadata subset on the recovery target machines,
    all occur in a sequence as stated and occur automatically without operator intervention.

4. The method of claim 1 wherein a user specifies a subset of the hosts, storage arrays and/or VMs upon a recovery event.

5. The method of claim 1 wherein the management server further permits a user to specify a subset of the hosts, storage arrays and/or VMs for replication as part of importing the metadata subset.

6. The method of claim 1 wherein the management server permits the user to reconfigure the hosts and/or VMs without interrupting operation of other hosts and/or VMs while the protected site is operating.

7. The method of claim 1 wherein replicating the storage arrays occurs continuously.

8. The method of claim 1 wherein replicating the storage arrays occurs continuously or on a scheduled basis.

9. The method of claim 1 wherein the recovery event is a time or disaster and/or time of test.

10. The method of claim 1 wherein the metadata comprises a representation of two or more of:
information about the management server;
groupings of hosts and virtual machines;
information about hardware needed for a host, including type of host, or network configuration for the host;
virtual switch configuration, including physical network interfaces, used by the virtual switch to route network traffic outside of the host, or virtual network interface configuration used by management network traffic, or network configuration for the virtual network interface, or types of traffic which can flow over the virtual network interface, or groupings of virtual ports on a virtual switch;
physical network interface configuration;
virtual machine definitions; or
resource pool definitions used to distribute CPU and memory resources.

11. An apparatus comprising:
a protected site including hosts, virtual machines (VMs) provisioned on the hosts, storage arrays, and a management server,
replicated storage arrays for replicating the storage arrays,
a metadata repository, accessible to a recovery site, for capturing configuration metadata received from hosts and VMs associated with each host to a metadata repository accessible to the recovery site;
a recovery site including recovery target machines,
an import tool for accessing the metadata repository for importing a metadata subset that represents configuration for recovery target machines, the metadata subset representing only a portion of the metadata;
a recovery manager, for
stopping replication of the storage arrays;
mapping target machines corresponding to the management server and hosts indicated by the metadata subset;
installing operating systems on the recovery target machines;
recovering the management server from the metadata subset to one of the recovery target machines;
recovering the hosts from the metadata subset to recovery target machines;
attaching recovery target machines to the replicated storage arrays; and
provisioning VMs from the metadata subset on the recovery target machines.

12. The apparatus of claim 11 wherein the metadata further includes a virtual switch configuration and a resource pool definition.

13. The apparatus of claim 11 wherein the recovery manager
assigns a number of target machines corresponding to the management server and hosts,
installs operating systems on the recovery target machines,
recovers the management server,
recovers the hosts from the metadata subset to recovery target machines,
attaches recovery target machines to the replicated storage arrays, and
provisions VMs from the metadata subset on the recovery target machines,
in a defined sequence as stated and automatically without operator intervention.

14. The apparatus of claim 11 wherein the recovery manager receives input from a user specifying a subset of the hosts, storage arrays and/or VMs upon a recovery event.

15. The apparatus of claim 11 wherein the recovery manager server further permits a user to specify a subset of the hosts, storage arrays and/or VMs for replication as part of the metadata subset.

16. The apparatus of claim 11 wherein the recovery manager permits a user to reconfigure the hosts and/or VMs without interrupting operation of other hosts and/or VMs while the protected site is operating.

17. The apparatus of claim 11 wherein replicating the storage arrays occurs continuously until halted, and then restarted after the recovery site is operational.

18. The apparatus of claim 11 wherein replicating metadata from the management server occurs on a scheduled basis.

19. The apparatus of claim 11 wherein the recovery event is a time or disaster and/or time of test.

20. The apparatus of claim 11 wherein the metadata comprises a representation of two or more of:
information about the management server;
groupings of hosts and virtual machines;
information about hardware needed for a host, including type of host, or network configuration for the host;
virtual switch configuration, including physical network interfaces, used by the virtual switch to route network traffic outside of the host, or virtual network interface configuration used by management network traffic, or network configuration for the virtual network interface, or types of traffic which can flow over the virtual network interface, or groupings of virtual ports on a virtual switch;
physical network interface configuration;
virtual machine definitions; or
resource pool definitions used to distribute CPU and memory resources.

21. A programmable computer system product for recovery of a protected data processing site, the protected site including hosts, virtual machines (VMs) provisioned on the hosts, storage arrays, and a management server, the programmable computer system product comprising one or more data processing machines that execute instructions retrieved from a storage media, the instructions for:
prior to a recovery event,
operating the management server to permit a user to configure the hosts and storage arrays, and to provision the VMs on the hosts;
replicating the storage arrays to replicated storage arrays at a recovery site;
capturing metadata from the management server concerning configuration of the hosts and VMs to a metadata repository accessible to the recovery site;
upon a recovery event,
stopping replication of the storage arrays to the replicated storage arrays;
accessing the metadata repository for importing a metadata subset that represents configuration for recovery target machines, the metadata subset representing only a portion of the metadata replicated from the management server;
assigning a number of target machines corresponding to the management server and hosts indicated by the metadata subset;
installing operating systems on the recovery target machines;

recovering the management server from the metadata subset to one of the recovery target machines;
recovering the hosts from the metadata subset to recovery target machines;
attaching recovery target machines to the replicated storage arrays; and
provisioning VMs from the metadata subset on the recovery target machines.

\* \* \* \* \*

UNITED STATES PATENT AND TRADEMARK OFFICE
CERTIFICATE OF CORRECTION

| | | |
|---|---|---|
| PATENT NO. | : 8,930,747 B2 | Page 1 of 2 |
| APPLICATION NO. | : 13/436111 | |
| DATED | : January 6, 2015 | |
| INVENTOR(S) | : Emmanuel S. Levijarvi et al. | |

It is certified that error appears in the above-identified patent and that said Letters Patent is hereby corrected as shown below:

In the Specification:
Col. 1, line 20 should read:
For example, one may undertake to replicate each physical Col. 1, line 49 should read:
net). This enables a data center operator to replicate critical Col. 2, line 15 should read:
storage replication scheme that operates entirely within the Col. 2, line 54 should read:
tomer acquires a need for them are such recovery machines Col. 3, line 43 should read:
104-A, 104-B, 104-C, storage arrays 106-1, 106-2, and a Col. 4, line 15 should read:
occur within the content of the SAN and separately from Col. 4, line 40 should read:
to a metadata XML document, which can be read at a later Col. 4, line 54 should read:
elements (metadata), which describe the private cloud Col. 5, lines 23-24 should read:
the way they are interconnected at the protected site 300.
The sample illustrates the collected metadata.

Signed and Sealed this
Fifth Day of May, 2015

Michelle K. Lee
*Director of the United States Patent and Trademark Office*

CERTIFICATE OF CORRECTION (continued)
U.S. Pat. No. 8,930,747 B2

Col. 5, line 62 should read:
Sample mapping:

Col. 6, line 29 should read:
which are not directly part of the virtual infrastructure. For Col. 7, line 4 should read:
this logical connection has not yet been made.

Col. 8, line 59 should read:
processor, disk storage, memort, input/output ports, net- Col. 9, line 33 should read:
embodiment, at least a portion of the software instructions